Aug. 11, 1931.    C. BREER    1,818,671

PISTON LUBRICATION

Filed July 19, 1926

Inventor
Carl Breer
By
Hing Harness
Attorney

Patented Aug. 11, 1931

1,818,671

UNITED STATES PATENT OFFICE

CARL BREER, OF DETROIT, MICHIGAN, ASSIGNOR TO CHRYSLER CORPORATION, OF DETROIT, MICHIGAN, A CORPORATION OF DELAWARE

PISTON LUBRICATION

Application filed July 19, 1926. Serial No. 123,388.

It is the primary object of my invention to provide a positive flow of lubricant to a piston and its associated parts.

Considering a piston for use in an internal combustion engine it is necessary to provide means for supplying lubricant to the cylinder walls in such quantities as to lubricate the walls under high temperatures and at the same time confine the lubricant within the limits of the piston. It is therefore another object of my invention to supply a quantity of lubricant to the cylinder walls through the piston and to maintain that supply within the region of the piston.

A further object of the invention is to maintain a supply of lubricant on the cylinder walls of an internal combustion engine at a predetermined pressure.

Another object of the invention is to lubricate the wrist pin bearings through the ends of the wrist pin.

These and other objects of my invention will more fully appear from the following specification and claims taken in connection with the accompanying drawings, in which:

Figure 1:
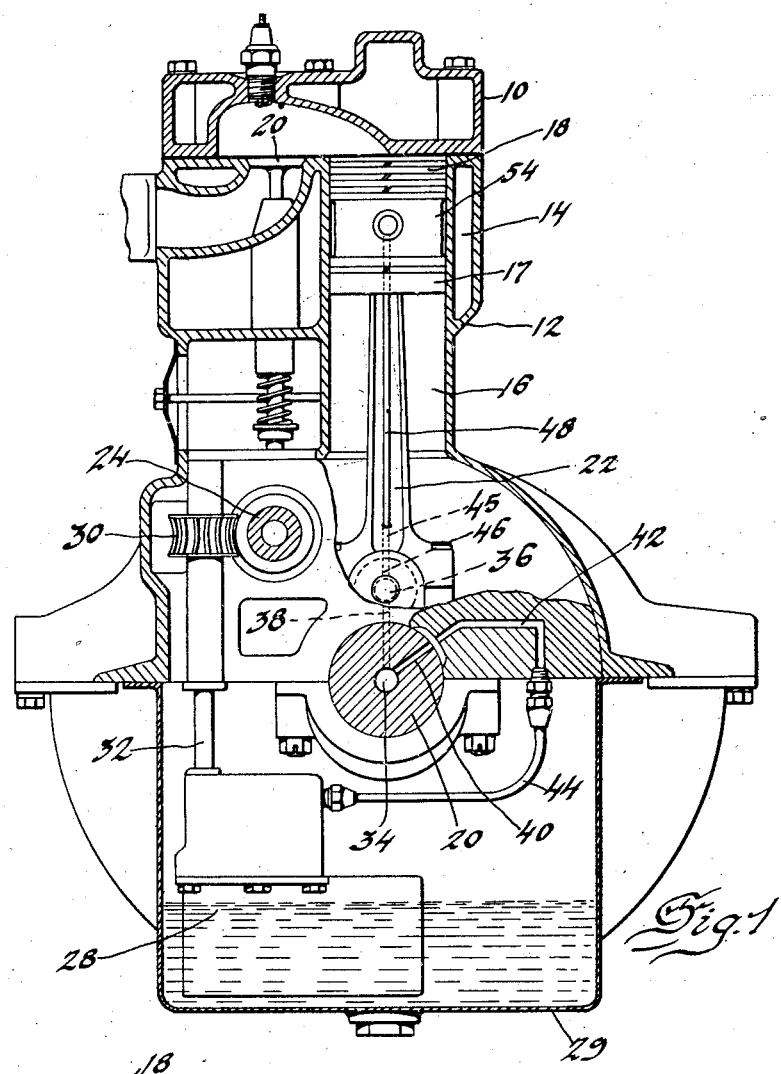
Fig. 1 is a vertical section through an internal combustion engine showing an adaptation of my invention.

Referring to Fig. 1 of the drawings, I have shown an internal combustion engine having a head portion 10, cylinder block 12, provided with water jacket 14 and cylinder 16. A piston 18, which hereinafter will be more fully described, is mounted in the cylinder 16 and connected to a crankshaft 20 by means of a connecting rod 22. A suitable driving connection, not shown, between the crankshaft 20 and camshaft 24, drives the camshaft 24 which in turn reciprocates intake and exhaust valves 26 and drives the oil pump 28 located in the oil pan 29 where a supply of lubricant is maintained, the drive being through gear 30 and shaft 32.

The crankshaft 20 is shown of the type adapted for force feed lubrication. A central passage 34 through the axis of each main bearing is connected to central passages 36 in each connecting rod bearing by passage 38. The central passage 34 receives its lubricant through passages 40, 42 and 44. A passage 46 leading from the central passage 36 is adapted to intermittently register with a conduit 48. The conduit 48 comprises a pipe, mounted on the side of the connecting rod and communicating at the bottom with the conduit 46 by inserting the end of the pipe in the conduit 45 in the connecting rod.

Figure 2:
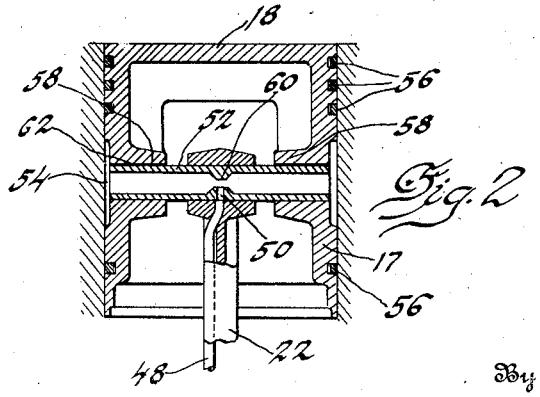
Fig. 2 is an enlarged cross section of a piston at right angles to the piston shown in Fig. 1.

Referring now to Fig. 2 the upper end of the conduit 48 is shown inserted in an opening in the top of the connecting rod registering with an opening 50 in a hollow wrist pin 52. An annular depression or well 54 is formed in the outer periphery of the skirt portion 17 of the piston 18, between piston rings 56, above and below the wrist pin bearings 58. A flange 60 is shown within the hollow wrist pin 52 over the opening 50 to divide the flow of lubricant thereby supplying both ends with an equal amount of lubricant. An oil groove 62 has been formed in the wrist pin bearings 58 to admit lubricant from the depression or well 54 to the bearings.

In the operation of the device, lubricant is supplied under a predetermined pressure through the crankshaft and connecting rod to the hollow wrist pin and depression or well 54 where the walls of the cylinder are supplied with lubricant under pressure and confined to the region of the piston by the piston rings above and below the well. Thus a quantity of lubricant is carried with the piston along the cylinder walls as the piston is reciprocated therein. The wrist pin bearings are lubricated by the return of the lubricant from the well to the crank case through the oil groove 62.

It will be understood that a positive flow of lubricant is supplied to the piston and its associated parts at a predetermined pressure, that a quantity of lubricant is supplied to the cylinder walls and confined within certain limits.

While I have illustrated one form of my invention it is not my intention to limit its scope other than by the terms of the appended claims.

What I claim is:

1. In a piston lubricating system of the class described comprising a piston having a skirt portion, wrist pin bearings carried by said skirt portion, a hollow wrist pin carried by said bearings, an annular depressed portion around the outer periphery of said skirt portion communicating with the ends of said hollow wrist pin and having a width greater than the diameter of said wrist pin for providing a lubricant well therebelow, and means for supplying lubricant under pressure to said hollow wrist pin.

2. In a piston lubricating system of the class described comprising a piston having a skirt portion, wrist pin bearings carried by said skirt portion, a hollow wrist pin carried by said bearings, an annular depressed portion around the outer periphery of said skirt portion communicating with the ends of said hollow wrist pin, means for supplying lubricant under pressure to said hollow wrist pin, and means for returning the lubricant from said depressed portion through the wrist pin bearings.

3. In a piston lubricating system of the class described comprising a piston having a skirt portion, an annular depressed portion in the outer periphery of the skirt portion, piston rings above and below said depressed portion, wrist pin bearings carried by said depressed portion, a hollow wrist pin having a radial opening adjacent its center carried in said bearings, a connecting rod having an opening registering with the radial opening in said wrist pin, means for supplying lubricant under pressure through the openings in said connecting rod and wrist pin to the depressed portion where the walls of a cylinder are lubricated and means for returning the lubricant from said depressed portion through a space between said bearings and wrist pin to lubricate the latter.

4. A piston lubricating system comprising a piston having a peripheral groove, wrist pin bearings in said piston, a wrist pin journaled in said bearings having a passage communicating with said groove, said groove being extended below said wrist pin for entrapping lubricant, means for supplying lubricant under pressure to said wrist pin and groove, and means for discharging lubricant from said groove through said bearings when the lubricant in said groove exceeds a predetermined level.

CARL BREER.